(12) United States Patent
Dooley et al.

(10) Patent No.: US 12,067,395 B2
(45) Date of Patent: *Aug. 20, 2024

(54) PRE-STAGED INSTRUCTION REGISTERS FOR VARIABLE LENGTH INSTRUCTION SET MACHINE

(71) Applicant: Tenstorrent Inc., Toronto (CA)

(72) Inventors: Miles Robert Dooley, Austin, TX (US);
Milos Trajkovic, Toronto (CA);
Rakesh Shaji Lal, Toronto (CA);
Stanislav Sokorac, Austin, TX (US)

(73) Assignee: Tenstorrent Inc., Toronto (CA)

( * ) Notice: Subject to any disclaimer, the term of this patent is extended or adjusted under 35 U.S.C. 154(b) by 56 days.

This patent is subject to a terminal disclaimer.

(21) Appl. No.: 18/098,068

(22) Filed: Jan. 17, 2023

(65) Prior Publication Data

US 2023/0153110 A1 May 18, 2023

Related U.S. Application Data

(63) Continuation-in-part of application No. 17/401,005, filed on Aug. 12, 2021, now Pat. No. 11,599,358.

(51) Int. Cl.
G06F 9/30 (2018.01)

(52) U.S. Cl.
CPC ........ *G06F 9/30145* (2013.01); *G06F 9/3004* (2013.01); *G06F 9/30134* (2013.01)

(58) Field of Classification Search
None
See application file for complete search history.

(56) References Cited

U.S. PATENT DOCUMENTS

| 5,680,641 | A  | * | 10/1997 | Sidman | G06F 9/3885 |
|           |    |   |         |        | 710/36 |
| 6,877,087 | B1 | * | 4/2005  | Yamada | G06F 1/3287 |
|           |    |   |         |        | 712/213 |
| 7,555,632 | B2 |   | 6/2009  | Nguyen et al. | |
| 2001/0021970 | A1 | | 9/2001 | Hotta et al. | |
| 2002/0099926 | A1 | | 7/2002 | Sinharoy | |
| 2002/0169942 | A1 | | 11/2002 | Sugimoto | |
| 2005/0166205 | A1 | | 7/2005 | Oskin et al. | |
| 2005/0289321 | A1 | | 12/2005 | Hakewill et al. | |

(Continued)

FOREIGN PATENT DOCUMENTS

EP   1131698 A1   9/2001

OTHER PUBLICATIONS

Parashar, A. et al., Triggered Instructions: A Control Paradigm for Spatially-Programmed Architectures, 2013, ACM, pp. 142-153. (Year: 2013).*

(Continued)

*Primary Examiner* — Eric Coleman
(74) *Attorney, Agent, or Firm* — Daylight Law, P.C.

(57) ABSTRACT

Methods and systems relating to improved processing architectures with pre-staged instructions are disclosed herein. A disclosed processor includes a memory, at least one functional processing unit, a bus, a set of instruction registers configured to be loaded, using the bus, with a set of pre-staged instructions from the memory, and a logic circuit configured to provide the set of pre-staged instructions from the set of instruction registers to the at least one functional processing unit in response to receiving an instruction from the instruction memory.

22 Claims, 7 Drawing Sheets

(56) References Cited

U.S. PATENT DOCUMENTS

| | | |
|---|---|---|
| 2008/0270749 A1 | 10/2008 | Ozer et al. |
| 2009/0024839 A1 | 1/2009 | Arssov |
| 2009/0077349 A1* | 3/2009 | Park ................ G06F 12/0875 |
| | | 712/43 |
| 2009/0198876 A1 | 8/2009 | Lai et al. |
| 2010/0228918 A1 | 9/2010 | Vorbach et al. |
| 2013/0339649 A1* | 12/2013 | Hsu .................... G09G 5/363 |
| | | 711/170 |
| 2014/0215185 A1* | 7/2014 | Danielsen ............ G06F 9/3836 |
| | | 712/205 |
| 2015/0220346 A1 | 8/2015 | Wang et al. |
| 2017/0046159 A1 | 2/2017 | Priyadarshi et al. |
| 2018/0081692 A1 | 3/2018 | Lee et al. |
| 2020/0150963 A1 | 5/2020 | Fusejima |
| 2020/0364051 A1 | 11/2020 | Sassone et al. |

OTHER PUBLICATIONS

Falcon, A. et al., Effective Instrucion Prefetching via Fetch Prestaging, 2005,IEEE, 10 pages. (Year: 2005).*

Extended European Search Report from EP Application No. 22189917.2 dated Jan. 20, 2023, 9 pages.

Falcon, A. et al., Effective Instruction Prefetching via Fetch Prestaging, 2005, IEEE, 10 pages. (Year: 2005).

Notice of Allowance dated Sep. 20, 2022 from U.S. Appl. No. 17/401,005, 9 pages.

Reddy, V.N. et al., Computing Performance Enhancement of VLIW Architecture Using Instruction Level Parallelism, Sep. 2020, Intl. Journal of Innovative Science and Research Technology 5 pages. (Year: 2020).

Examination Report dated Sep. 14, 2023 from EP Application No. 22189917.2, 5 pages.

* cited by examiner

PRE-STAGED INSTRUCTION REGISTERS FOR VARIABLE LENGTH INSTRUCTION SET MACHINE

CROSS REFERENCE TO RELATED APPLICATIONS

This application is a continuation-in-part of U.S. patent application Ser. No. 17/401,005, filed Aug. 12, 2021, which is incorporated by reference herein in its entirety for all purposes.

BACKGROUND

Processing architectures include functional units that must be supplied with both instructions and data to execute their functions. The instructions identify an operation and the data on which that operation will be executed. The operations are identified by operational codes of the processing architecture. The operational codes are strings of bits that represent a specific operation to be conducted (e.g., operational code "001" tells the functional processing unit to add while "002" tells the functional unit to subtract). There are numerous tradeoffs associated with the selection and design of the various operational codes of the functional processing unit or units of the processing architecture. The transmission of instructions through the system requires energy and time. Additionally, larger instruction sizes require larger buses, registers, and logic which increases the cost of the architecture. Generally, including a larger number of more specialized instructions can present significant benefits as, assuming the correct specialized instructions have been selected, more can be done per instruction and fewer instructions need to be transmitted through the system. However, more specialized instructions require the creation of a larger library of instructions, and more or more complex functional processing units to process the instructions which increases the cost of the architecture.

SUMMARY

Methods and systems related to the field of computer processing architectures and instructions sets are disclosed. The methods and systems disclosed herein include a processing architecture that can dynamically create large compound instructions that can be executed using the amount of power required for the movement of a single instruction. The methods and systems disclosed herein include a processing architecture that can achieve the functionality of a variable length instruction set machine with a minimally sized instruction bus. In specific embodiments, a processor is provided that includes a set of instruction registers which are loaded with a set of pre-staged instructions from an instruction memory and which are subsequently provided to at least one functional processing unit in response to the receipt of another instruction delivered from instruction memory.

Specific embodiments of the invention provide significant benefits. A processor in accordance with specific embodiments of the invention can create many different compound instructions that can be repeatedly executed while only using the amount of power and bus size associated with moving a single smaller component instruction. The architecture therefore maintains configurability for executing various compound instructions while not having the instruction size get too large or requiring an excessive number of instructions to be transmitted relatively long distances through the system to the functional processing units.

While the benefits described in the prior paragraph represent an improvement in processing architectures generally, there are certain applications in which they are particularly relevant. For example, in a processor designed to operate on a big data set such that a sequence of operations will be executed many times by the processor as it works its way through the data set, the sequence of operations can be pre-staged in the registers and then be repeatedly applied to different portions of the data in response to the transmission of only a single instruction from instruction memory. As another example, when a processor is meant to conduct many operations in parallel, the parallel set of operations can be pre-staged in the registers and then applied to different portions of the data in response to the transmission of only a single instruction from memory. In still further examples which involve a combination of both big data and parallel computing, sequences of large numbers of parallel instructions will need to be repeatedly applied to different portions of the data, and the same approach can be used to compound the reduction in the number of instructions that need to be transmitted through the system from instruction memory.

In specific embodiments of the invention, a processor is provided. The processor comprises a memory, at least one functional processing unit, a bus, a set of instruction registers, and a logic circuit. The set of instruction registers are configured to be loaded, using the bus, with a set of pre-staged instructions from the instruction memory. The logic circuit is configured to provide the set of pre-staged instructions from the set of instruction registers to the at least one functional processing unit in response to receiving an instruction from the instruction memory.

In specific embodiments of the invention, a method, in which each step is conducted by a processor, is provided. The method includes storing a set of instructions in a memory, loading a set of pre-staged instructions from the memory to a set of instruction registers, receiving an instruction at a logic circuit, and providing, in response to receiving the instruction and using the logic circuit, the set of instructions from the set of instruction registers to at least one functional processing unit.

In specific embodiments of the invention, a processor is provided. The processor comprises a memory, at least one functional processing unit, a bus, a set of instruction registers, a means for conducting a parsing operation on a set of instructions stored in the memory, identifying at least one redundancy, and writing an instruction to the memory based on the parsing operation, a means for loading the set of instruction registers with a set of pre-staged instructions using the bus, and a means for providing the set of pre-staged instructions from the set of instruction registers to the at least one functional processing unit in response to receiving the instruction from the memory.

DETAILED DESCRIPTION

Figure 1:
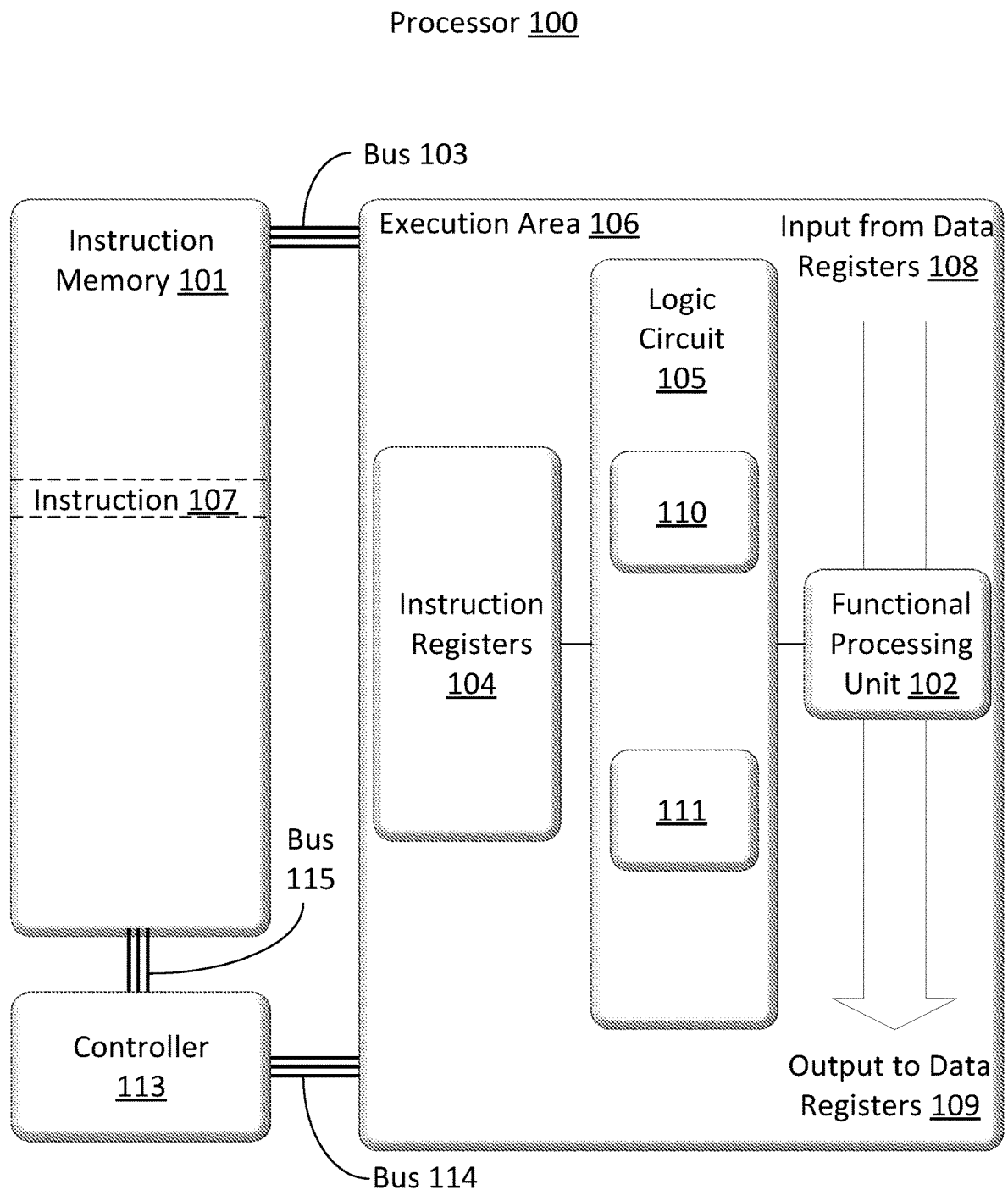
FIG. 1 illustrates a block diagram of a processor in accordance with specific embodiments of the invention disclosed herein.

Methods and systems related to the field of computer processor architectures in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Processor architectures involve the design of the various hardware elements required for a processor to conduct computations. A processor can include at least one memory and at least one functional processing unit which are used to conduct the computations of the processor. The computations can be conducted through the execution of instructions by the functional processing units. The memory can include a single hardware element or separate hardware elements. The memory can store both the data on which the computations will be conducted ("operand data") and the instructions themselves ("instruction data" or "instructions"). The processor can be at least partly defined by the instruction set of the processor in that the hardware elements of the processor are designed to operate with that set of instructions. For example, an instruction bus of the processor may be designed to accommodate a data element having the instruction size of the instruction set and the functional processing units of the processor may be designed to take specific actions when a register is loaded with a given operational code from the instruction set.

The processors disclosed herein can take on various forms. The processors can be processing cores in a multicore processor or standalone processors. The processors can be implemented as single chip systems, including wafer-scale single chip systems, multichip single package systems, or in a multichip multipackage system in which the chips are commonly attached to a common substrate such as a printed circuit board (PCB), interposer, or silicon mesh. The processor can be part of a network of processors. The network can be a network on chip (NoC). The processors in accordance with this disclosure can also be part of a network that includes chips on multiple substrates linked together by a higher-level common substrate such as in the case of multiple PCBs each with a set of chips where the multiple PCBs are fixed to a common backplane. Processors in accordance with this disclosure can also be implemented in chiplet based systems. For example, in specific embodiments of the invention, one or more processors could be housed or implemented by one or more networked chiplets, connected, for example, through an interposer.

The processors disclosed herein can include various elements. The processors can include at least one functional processing unit, a memory, and at least one bus. The processors disclosed herein could also include additional or more specific elements such as a network interface unit, controller, serializer/de-serializer, and nonvolatile memory for modifiable configuration information. The functional processing units of the processors can be used to execute component computations required for a computation network to execute a composite computation. The computation network can include routers on each of the processors and a system of buses that either solely connect adjacent processors for facilitating multi-hop communications or also connect distal processors facilitating single-hop communications between those distal processors.

The memory of the processor can take on various forms. The memory could be a random-access volatile memory such as a static random-access memory (SRAM). The memory could store both the instructions that are to be executed by the processor (instruction data) and the data those instructions will use as operands (operand data). The memory could be a cache memory of the processor or a main memory of the processor. The processors could include multiple memories such as a fast cache memory and a main memory. The processors could have a cache instruction memory and a separate cache data memory. In embodiments in which the memory stores compiled instruction data it can be referred to as an instruction memory of the processor. The processors could also have more than one instruction memory such as an architecture which includes a first instruction memory and a second instruction memory, such as a micro-op ache or trace cache, located between the first instruction memory and the functional processing units of the processor.

The functional processing units can take on various forms and be arranged in various ways on the processor. The functional processing units could be implemented in an execution area on the processor. The execution area could be a substantially contiguous region on the substrate of the processor (e.g., a silicon substrate). In specific embodiments of the invention, an execution area is small enough that the time required for the movement of data between any portion of the execution area is negligible relative to the period of the clock of the processor. In alternative embodiments, the execution area may take a number of clock cycles to traverse (e.g., 3 clock cycles). However, specific embodiments of the invention will realize significant benefits which are proportional to the relative cost of fetching instructions from memory and transmitting them to the execution area. In such embodiments, the benefit of pre-staging instructions, that will be repeatedly executed, will repeatedly save the time and energy associated with fetching the instructions from memory regardless of the size of the execution area. The bus could be an instruction bus for the processor which allows for direct routing of instructions from the instruction memory to the execution area. The functional processing units could be arranged entirely in parallel or in a computation pipeline. If the processors are processing cores, the processing pipeline can be the main computation pipeline of the processing core. The functional processing units can be any kind of computational unit including arithmetic logic units, floating point units, rounding units, general math units, compression units, data type modification units, load units, store units, and other fundamental computation units or computation pipeline units. Load units could be tasked with loading data from a cache memory of the processor, from the main memory of the processor, or from a staging area in the execution area of the processor into the computation pipeline of the processor. Store units could be tasked with storing data output by the functional processing units in a cache memory of the processor or a main memory of the processor. Alternative specialized functional processing units and sets of functional processing units are possible depending upon the application for which the processor is designed. For example, the functional processing units could form a graphics rendering pipeline or a systolic array for dense linear algebra computations.

In embodiments in which the processor includes a controller, such a controller can take on various forms. The processors disclosed herein could include a controller to coordinate the execution of operations within the processor and the exchange of data between the functional processing units and the memory of the processor (including both instruction data and operand data). The controller could handle numerous known actions conducted by standard processor controllers for the administration of the processor as are known in the art. For example, the controller could load instructions from the instruction memory into the execution area of the processor. More specifically, the controller could load the instructions into the instruction decode logic of the execution area of the processor. If the processor is a processing core in a multicore processor, the controller could be a core controller of the processor. In specific embodiments, the controller can be a dedicated Central Processing Unit (CPU) for conducting the administration of the processor.

In specific embodiments of the invention, the processors disclosed herein can include a set of instruction registers. The set of instruction registers can be located proximate the functional processing unit. The set of instruction registers can be in an execution area of the processor. The set of instruction registers can be closer to the functional processing units than the instruction memory. The set of instruction registers can be part of an instruction decode logic circuit of the processor. The set of instruction registers are separate and distinct from the instruction memory of the processor but can be loaded with instructions from the instruction memory. In specific embodiments, the instruction memory can be implemented in a cache memory of the processor in the form of an SRAM while the set of instruction registers are separate hardware units in the form of registers or latched logic circuits generally.

In specific embodiments of the invention, the set of instruction registers can be configured to be loaded, using a bus, with a set of pre-staged instructions. The instructions can be referred to as pre-staged because they are loaded into the set of instruction registers ex ante for later rapid application to the at least one functional processing unit of the processor. The set of instruction registers can be loaded with instructions from the instruction memory. The instruction registers can be configured to be loaded with the set of pre-staged instructions in various ways. For example, the instruction decode logic of the processor may identify a specialized operational code in certain instructions loaded from memory which indicate that the payload of that certain instructions should be provided to an instruction register. Processing of these special instructions by the instruction decode logic could then result in the storage of those instructions in the instruction registers as opposed to resulting in the immediate execution of an operation by the computational units of the processing core. In specific embodiments of the invention, the instruction decode logic of the processor could also identify an address indicating which instruction register the payload instructions should be loaded into. These specialized instructions can be referred to herein as "configuration instructions" with the operational code being a "configure" operational code identified by the instruction decode logic.

In embodiments in which the processors include a set of instructions registers that are configured to be loaded with a set of pre-staged instructions, the processors can achieve the functionality of a variable length instruction set machine. As the contents of the instruction set registers can be loaded with different sets of instructions, the processor can effectively create new compound instructions to be executed by the processor from a combination of the operational codes that the functional processing units are designed to execute. These compound instructions could include different numbers of component instructions such that the compound instructions were of variable length.

In specific embodiments of the invention, the pre-staged instructions can provide significant benefits in terms of either a reduced instruction bus size, a reduced number of instructions that need to be transmitted on the instruction bus, or a combination of both. As the contents of the instruction set registers can be loaded with sets of instructions that may be utilized a large number of times such as in the case of big data sets or looping routines, the associated instructions do not need to be repeatedly delivered from instruction memory to the execution area of the processor while still achieving the same amount of computation. Furthermore, although there is an overhead associated with loading these registers, if a prestored instructions set is to be utilized many times, this overhead can be negligible relative to the resulting savings. This is particularly true in the case of applications such as graphics rendering, training for machine learning applications, drawing inferences from artificial neural networks, and other applications.

In specific embodiments of the invention, the pre-staged instructions can be provided from the set of instruction registers to the at least one functional processing unit in response to receiving an instruction from the instruction memory. The instruction can include a specific operational code which will identify it as a "trigger instruction." The instruction decode logic of the processor could detect a "trigger" operational code in the instruction and initiate the providing of the pre-staged instructions to the at least one functional processing unit in response thereto. The instruction can be referred to as a trigger instruction because it triggers the providing of the pre-staged instructions to the at least one functional processing unit. The instruction can also be referred to as a macro instruction because the pre-staged instructions may be a set of component instructions that form a composite routine of instructions that are provided to the at least one functional processing unit in a sequence. In specific embodiments of the invention, and as described below with reference to FIG. 6, the trigger instruction can be identified by an operational code that will be acted upon by the functional processing units, but it will serve a dual purpose as a trigger instruction.

In specific embodiments of the invention, a trigger instruction can include a payload with configuration information regarding the manner in which the pre-staged instructions are provided from the set of instruction registers to the at least one functional processing unit and/or how the instructions should be executed by the at least one functional processing unit. As an example of configuration information, the trigger instructions could include sequence information for identifying a sequence for applying the instructions in the instruction registers to the at least one functional processing unit. The content of the trigger instruction could accordingly be designed to identify the pre-staged instructions via their addresses in the instruction registers and to describe their sequence via an arrangement of those addresses. As another example of configuration information, the trigger instruction could include execution information which specifies where specific operands for the instructions are located and where to put the results of the execution of the instructions. In embodiments in which the at least one functional processing unit is associated with a set of staging registers, the execution information could identify addresses in the staging registers in which to store the intermediate or final result of executing the instructions. The execution information could include additional specifications of how the pre-staged instructions should be executed such as which particular functional unit should be assigned the execution of the instruction, a precision by which the instruction should be executed, a desired data type of the output of the instruction, if the instruction should be suppressed in some other fashion, and multiple other alternatives.

FIG. 1 illustrates a block diagram of a processor 100 in accordance with specific embodiments of the invention disclosed herein. Processor 100 includes an instruction memory 101, a functional processing unit 102, a bus 103, a set of instruction registers 104, and a logic circuit 105. The functional processing unit 102, instruction registers 104, and logic circuit 105 are in an execution area 106 of the processor 100. Instruction memory 101 is separate from execution area 106 but is able to provide instructions to execution area 106 via bus 103. As bus 103 routes instructions from the instruction memory, bus 103 can be referred to as an instruction bus of processor 100. Instruction memory 101 stores instructions, such as instruction 107, for transmission to the execution area 106 via bus 103 in an order determined by their location in the instruction memory 101. The instructions can be provided to the instruction memory 101 by an automated compiler working on higher level instructions or directly by a human programmer. In specific embodiments of the invention, processor 100 utilizes an instruction fetch command as a trigger for stepping through the program and fetching the next instruction from instruction memory 101 for delivery to execution area 106. Functional processing unit 102 is drawn overlying a main computational data flow of the processor 100. The inputs to the data flow are input data registers 108 in the execution area 106 and the output of the data flow are output data registers 109 in the execution area 106. In specific embodiments of the invention, the data flow will include a computational pipeline of the processor 100 of which functional processing unit 102 is a part. The input data registers 108 and output data registers 109 may be staging registers for data which will be more permanently stored as operand data in the memory of the processor. In specific embodiments of the invention, the input data registers 108 and the output data registers 109 may be the same such that the output overwrites the input. The memory for the operand data could be the same hardware element as instruction memory 101 or it could be a different memory such as a cache memory or main memory of the processor.

Processor 100 can be at least partly defined by an instruction set of processor 100. The instruction set can include all the instructions that can be recognized by the functional processing units of the processor—such as functional processing unit 102. Bus 103 can be at least as wide as an instruction size of the instruction set. For example, the instruction size could be 32 bits and the bus could be a 32-wire bus. Furthermore, the instruction registers 104 can be designed to store pre-staged instructions having the instruction size of the instruction set. Processor 100 can have an instruction set which includes a trigger instruction to trigger the providing of instructions from the instruction registers to the functional processing unit and configuration instructions for controlling the initial storage of pre-staged instructions in the instruction registers.

In specific embodiments of the invention, processors can include logic circuits in the form of instruction decode logic circuits that operate in combination with the functional processing units of the processor to execute the instructions. The instruction decode logic circuits can be at least partly defined by the instruction set of the processor. For example, logic circuit 105 can include an instruction decode logic circuit 110 that operates in accordance with the instruction decode logic circuits of standard processors to decode instructions provided on bus 103 for execution by functional processing unit 102. As such, the functional processing unit 102 and the instruction decode logic circuit 110 can execute instructions such as instruction 107 from instruction memory 101 using operand data from input data registers 108 to output operand data to output data registers 109. Furthermore, in addition to decoding instructions for execution in accordance with the approaches of standard processors, instruction decode logic circuit 110 can also include functionality to identify configuration and trigger instructions and process them appropriately. The logic circuit can recognize the associated operational codes using standard processes for identifying operational codes. The logic circuit can then be put into a state to either route instruction data to instruction register 104 (upon receipt of a configuration instruction) or to route instruction data from instruction registers 104 to the functional processing unit 102 (upon receipt of a trigger instruction).

In specific embodiments of the invention, processors can include means for loading a set of instruction registers with a set of pre-staged instructions using a bus. The instruction registers could be configured to be loaded, using a bus, with a set of pre-staged instructions from the instruction memory. For example, the bus could be an instruction bus of the processor, such as bus 103, and the instruction registers should be configured to alternatively connect to an instruction fetch line coupled to bus 103 via a multiplexer or cross bar latch, or the instruction registers could be connected to logic circuit 105 in order to receive the instructions after they have been processed by the logic circuit. The means for loading the set of instruction registers 104 with a set of pre-staged instructions using bus 103 could be instruction decode logic circuit 110. Instruction decode logic circuit 110 could be designed to inspect an instruction provided on bus 103, in response to an instruction fetch command, recognize the instruction as a configuration instruction, and take appropriate action to load pre-staged instructions into the instruction registers (e.g., instruction registers 104) such as routing the payload of the configuration instruction to a specific register. Instruction decode logic circuit 110 could route the instructions to specific registers according to a fixed schedule such as a cycled order through the register addresses. Alternatively, the configuration instruction could include specific information regarding which instruction register a pre-staged instruction should be loaded into. As mentioned elsewhere, the configuration instruction could include other instruction data (e.g., what type of instruction the pre-staged instruction is) and other data associated with the pre-staged instruction (e.g., how it should be executed and what the operands of the instruction are). In specific embodiments, a payload of the configuration instruction could be the pre-staged instruction itself or the bulk of such an instruction. In specific embodiments, instruction decode logic circuit 110 could change its state after detecting a configuration instruction and directly route additional instructions to the instruction registers as they are received instead of decoding them. In these embodiments, the configuration instruction could include a counter for how many instructions that instruction decode logic circuit 110 should route to the instruction registers before reverting to its nominal state. Alternatively, a separate instruction to turn off the configuration mode could then return instruction decode logic circuit 110 to its normal state in which additional incoming instructions were processed as normal. In the alternative or in combination, a means for loading the set of instruction registers using a bus could include a controller, such as controller 113. The controller could be configured to load, using a bus, the set of pre-staged instructions from the instruction memory to the set of instruction registers. This process could override the operation of the logic circuit 105 and write directly to addresses within instruction registers 104 using bus 114 in order to pre-stage the set of instructions. The controller could be a software-accessible controller to facilitate debugging of the operation of the instruction registers. Controller 113 can also load instructions into instruction memory 101 via bus 115 to facilitate debugging of the configuration instructions. In embodiments where processor 100 is a processing core, controller 113 could be a core controller.

In specific embodiments of the invention, processors can include a means for providing a set of pre-staged instructions from a set of instruction registers to at least one functional processing unit in response to receiving an instruction from the instruction memory. For example, the processor could include a logic circuit configured to provide the set of pre-staged instructions from the set of instruction registers to the at least one functional processing unit in response to receiving an instruction from the instruction memory. In the example of FIG. 1, logic circuit 105 can include a pre-staged instruction delivery logic circuit 111 to facilitate the providing of the pre-staged instructions to functional processing unit 102. In specific embodiments of the invention, pre-staged instruction delivery logic circuit 111 can do so under the control of a controller such as controller 113. In specific embodiments of the invention, pre-staged instruction delivery logic circuit 111 can do so under the control of configurability information provided by instruction decode logic circuit 110. Instruction decode logic circuit 110 can provide such configurability information from the payload or operational code of a trigger instruction upon receiving such a trigger instruction on bus 103. In either of these classes of embodiments, the pre-staged instruction delivery logic circuit can be initiated by the instruction decode logic circuit upon decoding a trigger instruction. In either of these classes of embodiments, the pre-staged instruction delivery logic circuit (e.g., pre-staged instruction delivery logic circuit 111) can be designed to provide a sequence of instructions from the instruction registers to the functional processing units synchronized by instruction fetch commands sent by a controller of the processor (e.g., controller 113). The instruction fetch commands can be the standard signal sent out by the controller in order to synchronize the operation of the processor in the execution of its instructions.

Depending on the embodiments of the invention, the instructions in the instruction registers can have the same size as the instruction size of the instruction set of the processor or can have a different size. For example, the pre-staged instructions can be delivered to logic circuit 105 in a first format which identifies them as intended for storage in instruction register 104 and can then be stored in a second format in instruction registers 104. The second format could have fewer bits than this first format. An operational code of the instruction when it is first delivered to logic circuit 105 may identify it as a configuration instruction while a header of the instruction when it is stored in instruction register 104 may identify it as math operation or some other kind of operation that would be executable by functional processing unit 102. As another example, the pre-staged instructions can be delivered directly to instruction register 104 without modification by either controller 113 or by logic circuit 105.

A specific example of the functionality of processor 100 is illustrative of the benefits of certain embodiments of the invention. Functional processing unit 102 may be a floating-point unit for executing a program stored in instruction memory 101. The program could be a loop of four floating-point unit operations that must be conducted on a big data set. The data set may include billions of entries such that the loop needs to run billions of times in order to process the entire data set. To conduct this operation, the compiler could compile a set of instructions for instruction memory 101 which first instructs logic circuit 105 to pre-stage the four floating-point unit operations of the loop into instruction register 104 and then instructs logic circuit 105 to apply those instructions in a repeating sequence to functional processing unit 102. The initial loading of the instruction registers may be implemented by the delivery of four configuration instructions to logic circuit 105. Each repetition of the sequence may be implemented by the delivery of a trigger instruction with a payload identifying additional data to run the sequence on. This example illustrates the benefit of the disclosed architecture because the number of instructions that must be transmitted through bus 103 is reduced by a factor of four. If the data set includes billions of loops, this can represent significant savings and the overhead of sending the initial four configuration instructions is negligible. This provides a significant benefit in that bus 103 can be kept small due to a smaller required instruction size (more complex instructions can be formed by sending configuration information so each component instruction can be small) and because the transportation of instructions within the execution area is less power intensive than the transportation of instructions to the execution area from the instruction memory. Additionally, the trigger instruction could include sequence information to identify in which order the four operations should be run. This example therefore illustrates an additional benefit in that commonly used component instructions can be reconfigured into different compound instructions without the need to send additional configuration instructions to reconfigure which instructions are stored in instruction registers 104.

In specific embodiments of the invention, the systems disclosed herein may include an interpreter block which analyzes instruction sequences and generates the configuration and trigger instructions described above. For example, instead of a compiler generating a set of instructions in instruction memory 101 with the configuration and trigger instructions described herein, the instructions in instruction memory 101 could be analyzed by an interpreter block (e.g., as they are loaded into instruction memory 101) and the interpreter block could identify the potential for efficiency increases attributable to the use of compound instructions as described herein. The interpreter block could be implemented entirely in hardware and be designed to store and compare series of instructions to detect replications of instruction sequences, and to take action in response to their detection. The actions taken in response to detecting the sequences can include inserting configuration instructions into instruction memory and inserting the detected sequence into the instruction memory along with trigger instructions to trigger repeated uses of the compound instruction formed by the instruction sequence. In specific embodiments, the interpreter block can insert configuration instructions into a separate cache or a separate instruction memory that is between the instruction memory and the decode logic of the processor such as a micro-op cache or a trace cache. An example of an interpreter block is provided below in FIG. 7.

Figure 2:
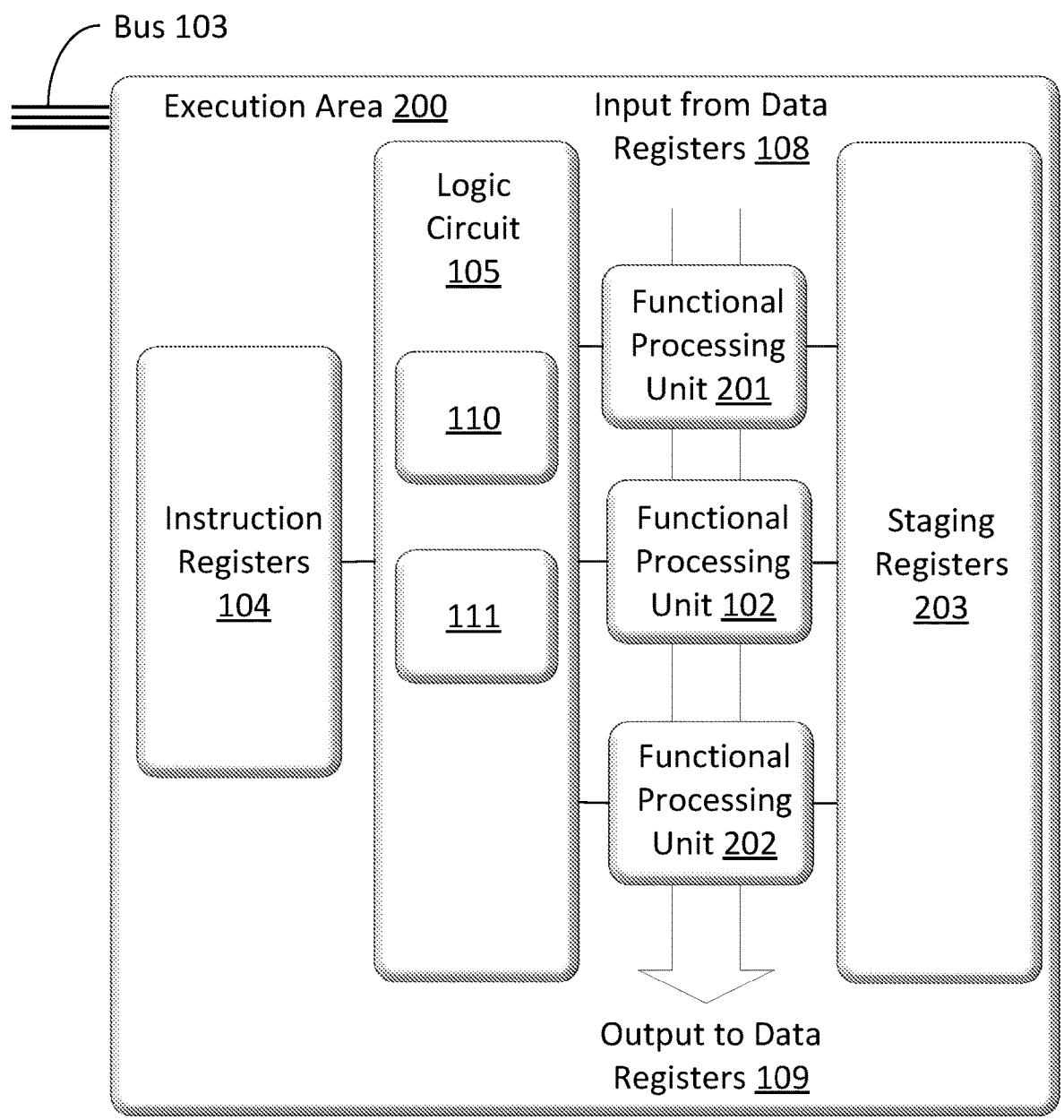
FIG. 2 illustrates a block diagram of an execution area of a processor in accordance with specific embodiments of the invention disclosed herein.

FIG. 2 illustrates a block diagram of an execution area of a processor in accordance with specific embodiments of the invention disclosed herein. Execution area 200 can be used to explain further embodiments of the invention. In specific embodiments of the invention, the processor can include two or more functional processing units that can be fed with instructions from the instruction registers in parallel. Reference numbers from FIG. 1 are re-used to indicate elements that have been described previously. Execution area 200 is distinguishable from execution area 106 because it explicitly shows multiple functional processing units on the data flow path of the processor. Specifically, execution area 200 includes functional processing unit 201 and functional processing unit 202. The individual functional units in this disclosure can require more than one clock cycle to execute instructions and therefore can execute instructions in a pipelined fashion. Additionally, multiple functional processing units can be arranged to conduct a pipeline of operations on data. For example, the functional units in FIG. 2 can be arranged to obtain data from input data registers 108 and operate on the data using a systolic array paradigm in which the output of each functional unit (i.e., 201 and 102) is provided as input to the next functional unit (i.e., 102 and 202 respectively). Furthermore, the multiple functional units can be arranged to operate in a pipelined fashion by writing and reading from a set of common registers, such as staging registers 203. For example, functional processing unit 201 could write output data to staging register 203 which is then read as input data by functional processing unit 202. In the specific embodiments of FIG. 2, the functional processing units are configured such that they can utilize any of the three pipelining concepts mentioned above. Furthermore, the manner in which the pipelining is conducted can be described in execution information in the configuration or trigger instructions that are received on bus 103. In accordance with specific embodiments of the invention, logic circuit 105 can provide instructions from instruction register 104 to any of the functional processing units in the pipeline. Execution area 200 is further distinguishable from execution area 106 because it includes a set of staging registers 203 which are accessible to the functional processing units 102, 201, and 202. Staging registers 203 can be a set of general-purpose registers which are available to the functional processing units.

In systems in which an execution area includes multiple functional processing units, the instructions from the instructions registers can be routed to the correct functional processing unit in various ways. For example, in specific embodiments, the instruction in the instruction registers can include instruction data which identifies which functional processing unit the instruction is intended for (e.g., directly via a functional processing unit identifier or indirectly by including an operational code that can only be executed by a specific functional unit). As another example, the instruction decode logic can store the instruction in a specific instruction register that is associated with a given functional processing unit. The instruction decode logic can get the information required for that storage step either from an analysis of the operational code of the instruction or from an analysis of configuration data stored in the payload of the instruction.

In processing architectures in which a processing pipeline includes a set of staging registers, the specific addresses for the staging registers to be used during the execution of a set of instructions in the instruction registers can be specified by configuration data in a trigger instruction. Execution area 200 includes a set of staging registers 203 accessible to the functional units. The staging registers can store intermediate results from the functional processing units that may be needed by other functional processing units in the pipeline outside the main flow of the pipeline. In these embodiments, the trigger instruction for an execution of instructions in the instruction registers could include configuration information and the logic circuit 105 could be configured to provide the set of pre-staged instructions from the set of instruction registers 104 to the functional processing units 102, 201 and 202 along with the configuration information. The configuration information could set addresses in the staging registers 203 to be used by the set of pre-staged instructions. In specific embodiments, the instructions in the instruction registers may be smaller than the instruction delivered on bus 103. For example, the instructions delivered on bus 103 could be 32-bit instructions and the instructions stored in the instruction registers 104 could be 28-bit instructions. In these embodiments, the configuration information from a trigger instruction could be large enough to provide each instruction in the set of instruction registers 104 with 4 bits in order for them to be a full 32-bit instruction for processing by the instruction decode logic circuit 110. The configuration information could include additional information in alternative embodiments which would increase the size of the pre-staged instructions prior to being executed by the functional processing units.

Figure 3:
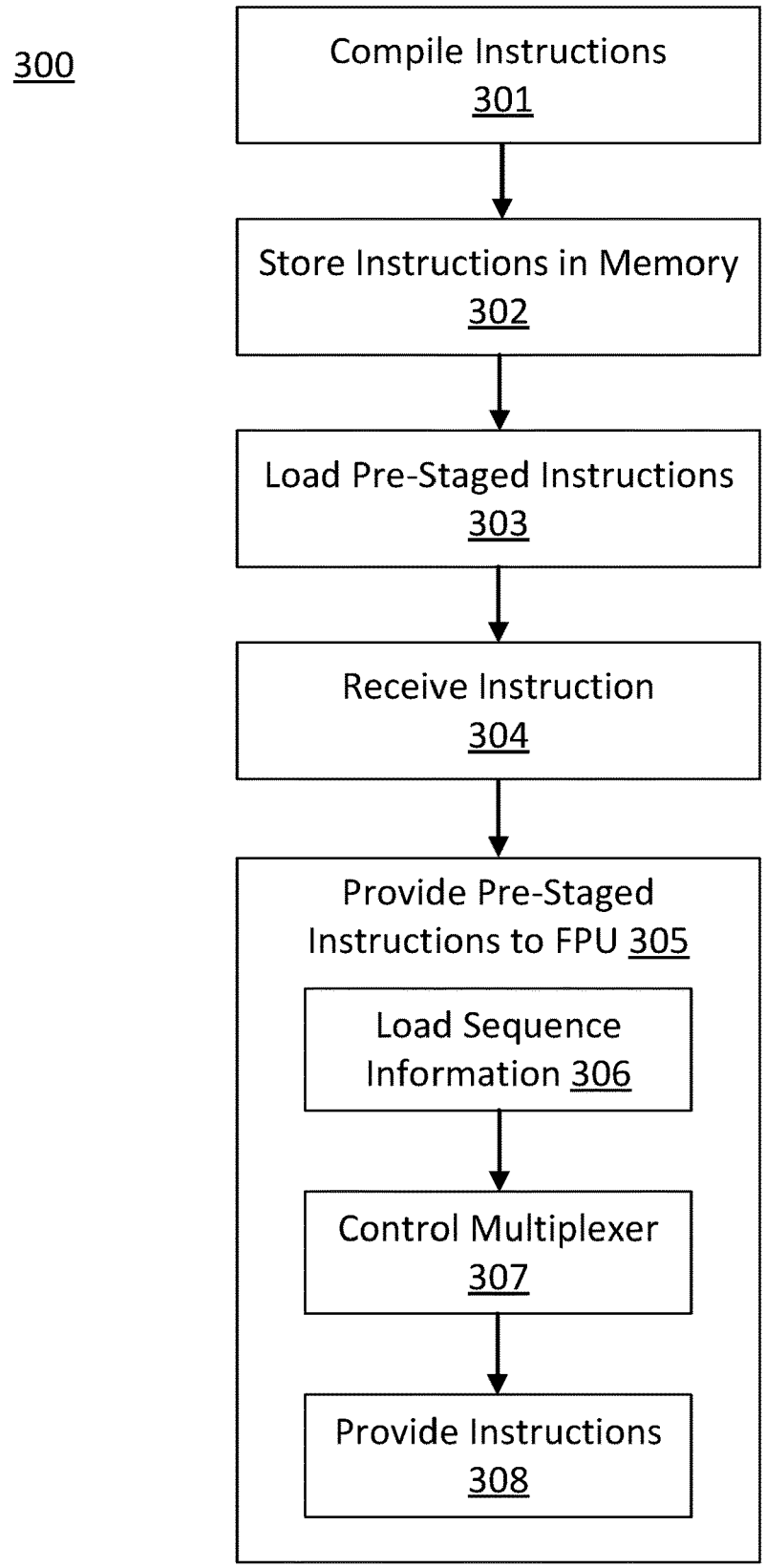
FIG. 3 illustrates a flow chart for a set of methods that are in accordance with specific embodiments of the invention disclosed herein.

FIG. 3 illustrates a flow chart 300 for a set of methods that are in accordance with specific embodiments of the invention disclosed herein. Flow chart 300 begins with a step 301 of compiling instructions for a computation to be executed by a processor. The step can result in the storage of a sequence of instructions in an instruction memory of the processor. Step 301 can be conducted by a compiler that is part of the processor, or by an external compiler where the instructions are pushed to the processor over a network being used to execute a composite computation in which the processor is only a single processing node. In specific embodiments, step 301 can also be conducted through the operation of control system by a human programmer who directly specifies a sequence of instructions for storage in the instruction memory. The instructions could be stored in a sequence of addresses that will be accessed sequentially by a program counter as synchronized by an instruction fetch command issued by a controller of the processor.

Step 301 can include steps to increase the parallelization of the execution of the program. The compiler can search for loops in the program for this purpose and form a set of pre-staged instructions and associated configuration data for each of the operations in the loops. Step 301 can also include the generation of configuration and trigger instructions for inclusion into the sequence of instructions. This step can be conducted as part of the processes of searching for loops in the program in that the configuration instructions can pre-stage instructions for an execution of the loop in the instruction registers of the processor and the trigger instructions could trigger one execution of the loop by triggering the providing of the pre-staged instructions from the instruction registers to at least one functional processing unit of the processor.

In specific embodiments of the invention, step 301 can, instead of involving a compiler compiling instructions, be conducted in a different manner by an interpreter block, or other hardware system, as it evaluates a sequence of instructions to search for loops or redundancies. As part of this step, the interpreter block could then generate the configuration and trigger instructions required to utilize the compound instructions disclosed herein. In these embodiments, a compiler does not need to be programmed to generate configuration and trigger instructions as this workload can be conducted by the interpreter block operating upon a standard sequence of instructions generated by a compiler that does not use the approaches disclosed herein.

Flow chart 300 continues with a step 302 of storing instructions in an instruction memory. The instructions can be the instructions compiled in step 301, including trigger and configuration instructions. The instruction memory can be a local cache or main memory of the processor. For example, the instruction memory could be instruction memory 101 from FIG. 1. The instructions can be stored according to an order in which they will be executed.

Flow chart 300 continues with a step 303 of loading a set of pre-staged instructions from the instruction memory to a set of instruction registers using a bus. The bus can be an instruction bus of the processor. The instructions can be processed by a logic circuit in an execution area of the processor and routed to the instruction registers according to the approaches described above. For example, instruction decode logic circuit 110 could receive a configuration instruction on bus 103 and switch to a mode where additional instructions received on bus 103 were routed to instruction registers 104. Alternatively, specific instructions received on bus 103 could identify themselves as instructions that should be routed by instruction decode logic circuit 110 into instruction registers 104. This step can be conducted in synchronization with an instruction fetch command of the processor. This step can include actions taken by a controller of the processor as well as the instruction memory and logic circuits of the processor.

Flow chart 300 continues with a step 304 of receiving an instruction. The instruction can be received at a logic circuit on a processor. The logic circuit can be an instruction decode logic circuit of the processor. The instruction can be received according to the standard process for the fetching of instructions for execution by a processor. The instruction can be received on an instruction bus of the processor. Alternatively, the instruction can be delivered from a controller of the processor on a bus used for debugging or otherwise overriding the usual manner of delivery of instructions to the instruction decode logic of the processor. The instruction can be a trigger instruction that will initiate the transfer of pre-staged instructions from the instruction registers to the at least one functional processing unit of the processor. The trigger instruction can alternatively be an instruction which itself can be executed by the functional processing unit, but also includes information, such as a flag or other header information, which indicates that the pre-staged instructions should be provided from the instruction registers.

In specific embodiments of the invention, the instruction received which will initiate the providing of instructions to a functional processing unit, such as a trigger instruction received in step 304, can include configuration information regarding how the pre-staged instructions should be executed. The configuration information can include selection information, sequence information, and/or execution information. The logic circuit of the processor can be configured to select, using selection information, a subset of the set of pre-staged instructions stored in the instruction registers. The logic circuit can also be configured to provide, in accordance with the sequence information, the subset of the set of pre-staged instructions to the at least one functional processing unit in a specified sequence. For example, a trigger instruction could include configuration information which would select two out of twelve pre-staged instructions, using selection information, and could specify that one of those instructions should be executed before the other, using sequence information. In specific embodiments of the invention, the sequence information could be implicit in the arrangement of the selection information. For example, the trigger instruction could have a payload with a first register address followed by a second register address. Accordingly, due to the order of storage of the two addresses, the sequence and selection information is combined. The selection of those two register addresses would serve as the selection information while the order of the two addresses in the payload would serve as the sequence information.

Flow chart 300 continues with a step 305 of providing, in response to receiving the instruction and using a logic circuit, the pre-staged instructions from the set of instruction registers to at least one functional processing unit. The pre-staged instructions can be provided to the at least one functional processing unit using configuration information that is provided along with the instruction. The instruction could be the trigger instruction mentioned above. The step can be executed by the logic circuits of the processor. For example, the step could be conducted by logic circuit 105 of processor 100. As a more specific example, the step could be conducted by pre-staged instruction delivery logic circuit 111. The Pre-staged instruction delivery logic circuit 111 could execute step 305 in response to a signal from instruction decode logic circuit 110 or in response to a signal from a controller of the processor such as controller 113.

Flow chart 300 includes a set of sub-steps for step 305 to describe a specific embodiment for the execution of step 305. The specific exemplified execution of the step can be conducted by a pre-staged instruction delivery logic circuit, with a multiplexer and a shift register, in which the shift register controls which register is accessed at a given time and the multiplexer allows for passage of the contents of that register to the at least one functional processing unit of the processor. The sub-steps include a step 306 of loading, using a logic circuit, a shift register of the logic circuit with sequence information from the instruction, a step 307 of controlling a multiplexer with the sequence information from the shift register, and a step 308 of providing, through the multiplexer, the set of pre-staged instructions from the set of instruction registers to the at least one functional processing unit. A specific system for executing these sub-steps can be described below with reference to FIG. 4.

In specific embodiments of the invention, the processor includes a logic circuit with a shift register and multiplexer for conducting the providing of pre-staged instructions from the instructions registers to the functional processing unit.

The logic circuit can serve the purposes of a pre-staged instruction delivery logic circuit such as pre-staged instruction delivery logic circuit 111. The shift register could be control-coupled to the multiplexer and the multiplexer could be configured to provide the content of various different instruction registers to a given functional processing unit based on the control input from the shift register. The various inputs to the multiplexer could be different instruction registers in a set of instruction registers. The inputs to the multiplexer could also include a direct link to the instruction bus which would allow the pre-staged instruction delivery logic circuit to be bypassed. The inputs to the multiplexer could also have hard coded instructions that were commonly accessed. In case such hard coded instructions were required to be executed in any given compound instruction, embodiments of the invention would further save time and energy in that the hard coded instructions would not need to be set ex ante by a configuration instruction.

Figure 4:
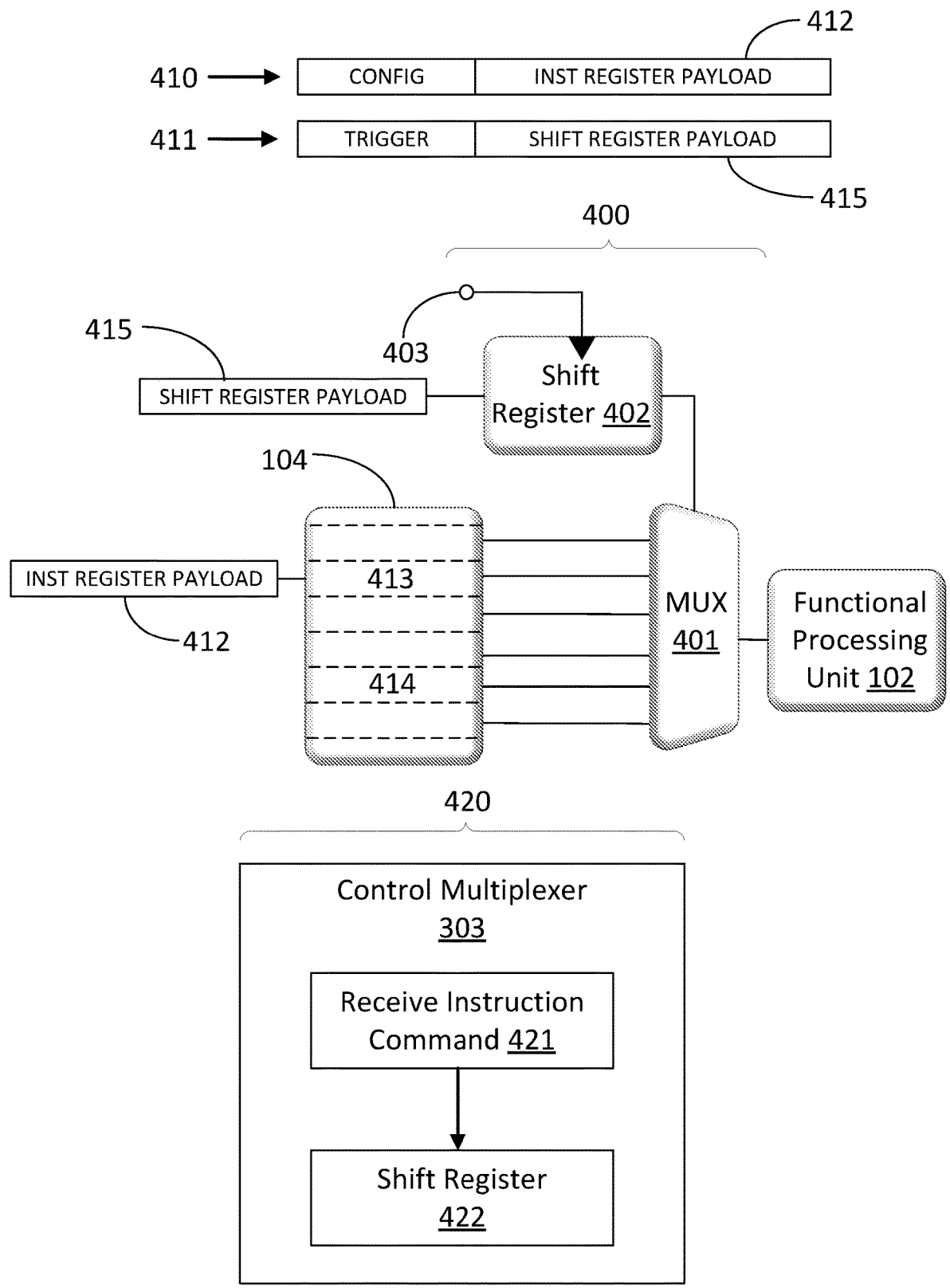
FIG. 4 illustrates a block diagram and flow chart to illustrate the operation of a portion of a logic circuit in accordance with specific embodiments of the invention disclosed herein.

FIG. 4 illustrates a block diagram and flow chart to illustrate the operation of a portion of a logic circuit in accordance with specific embodiments of the invention disclosed herein. The portion of the logic circuit 400 can include a multiplexer (MUX) 401 and a shift register 402. Multiplexer 401 is control-coupled to shift register 402. The portion of the logic circuit 400 can be a pre-staged instruction delivery logic circuit such as pre-staged instruction delivery logic circuit 111. The portion of the logic circuit 400 can, in combination with instruction decode logic that recognizes a trigger instruction, serve as a means for providing a set of pre-staged instructions from a set of instruction registers to at least one functional processing unit in response to receiving an instruction from the instruction memory. As will be described with reference to FIG. 5, multiple instantiations of the portion of the logic circuit 400 can be used in combination to supply instructions to multiple functional processing units in parallel. The portion of the logic circuit 400 can also execute steps 307 and 308 from flow chart 300 and receive the sequence information loaded in step 306. An instruction decode circuit can conduct step 306 in such embodiments and serve as a means for loading the set of instruction registers with a set of pre-staged instructions using the bus.

In specific embodiments of the invention, a payload of a configuration instruction will be used to load the instruction registers and a payload of a trigger instruction will be used to load the shift registers. The shift registers can be loaded with the address of specific instruction registers in the encoding space of the multiplexer to which they are connected. The shift registers can be loaded with a sequence of such addresses in order to trigger the providing of pre-staged instructions from the instruction register associated with such addresses through the functional processing units. The shift register can be configured to shift for various reasons as described below. Regardless of the manner in which the shift register is shifted, as the values in the shift registers are cycled, sequences of instruction register addresses will be provided to the multiplexer and the pre-staged instruction, and the associated instruction will be provided to the associated functional processing unit and executed. In this way, the logic circuit of the processor can be configured to load the shift register with sequence information from the instruction and be configured to, using the sequence information and the shift register, provide the pre-staged instructions from the set of instruction registers through the multiplexer to the at least one functional processing unit. However, multiple alternative approaches for these steps are also possible.

In alternative embodiments of the invention, a payload of one or more configuration instructions will be used to load both the instruction registers and provide sets of pre-staged inputs to the shift registers while a payload of a trigger instruction will be used to select which of the sets of pre-staged inputs should be provided to the shift register. These approaches differ from the approaches described in the prior paragraph in that the payload of the trigger instruction can be even smaller as it will only select a set of pre-staged inputs to the shift registers instead of encoding the entire set of pre-staged inputs. Otherwise, the approaches are similar to those described in the prior paragraph. After a trigger instruction is received which identifies a set of pre-staged inputs for the shift register, the set of pre-staged inputs can be loaded into the shift register. The pre-staged inputs can be the addresses of specific instruction registers in the encoding space of the multiplexer to which they are connected. The pre-staged inputs for the shift registers can be a sequence of such addresses in order to trigger the providing of pre-staged instructions from the instruction register associated with such addresses through the functional processing units.

FIG. 4 includes a configuration instruction 410 and a trigger instruction 411. The illustrated logic circuit functions by first loading the instruction registers 104 with pre-staged instructions. For example, the payload 412 of configuration instruction 410 can be loaded into instruction register 413 and stored as a pre-staged instruction. In this example, a separate instruction was previously loaded into instruction registers 104. Subsequently, payload 415 of trigger instruction 411 can be loaded into shift register 402. Payload 415 can be the address of instruction register 414 followed by the address of instruction register 413 in the encoding space of MUX 401 and can be loaded into sequential registers of shift register 402. Alternatively, as described above, payload 415 can identify a set of pre-staged inputs for the shift register in the form of the sequence of addresses mentioned in the prior paragraph. In such approaches, the set of pre-staged inputs can be provided by configuration instructions 410 which also have shift register payloads.

In specific embodiments of the invention, trigger instructions can include sufficient configuration information to select and sequence a large number of pre-staged instructions for execution by a functional processing unit or units of a processor. For example, if the encoding space of MUX 401 was two bits and payload 415 was a 24-bit payload, payload 415 would be able to select and sequence 12 pre-staged instructions for execution by functional processing unit 102. The Payload 415 of trigger instruction 411 would therefore be both sequence and selection information (specifying that the instructions in instruction registers 413 and 414 should be executed along with the order in which they should be executed). At this point, the circuit will be primed to provide the pre-staged instructions to the functional processing unit. Flow chart 420 provides sub-steps for the execution of step 303 from flow chart 300 including a step 421 of receiving a processor instruction fetch command and a step 422 of shifting the shift register upon receiving the processor instruction fetch command. The steps can involve a shift register, such as shift register 402, receiving a processor instruction fetch command on an input, such as input 403, and shifting the shift register accordingly. As a result, the content of the next register of shift register 402 will be provided to the control input of a multiplexer. For example, shift register 402 could first output the address of instruction register 414 to MUX 401, which would cause the MUX to provide the instruction from instruction register 414 to functional processing unit 102, and could then be shifted through receipt of a signal on input 403 to output the address of instruction register 413 to the control input of MUX 401. Accordingly, the trigger instruction can create different compound instructions based on a set of pre-staged instructions by loading the shift register according to different sequences. While not provided in this example, different compound instructions can also be distinguished based on other configuration information from the trigger instruction such as the address of input, output, or intermediary registers for the instructions to utilize during execution.

In specific embodiments of the invention, the shift registers described throughout this disclosure can be configured to shift in different ways. In specific embodiments, the shift registers can shift as soon as a set of designated dependencies have been satisfied. The designated dependencies can vary through the course of operation of the device. The dependencies can be programmed by a higher-level controller or through control information sent in configuration or trigger instructions. The set of dependencies can be programmed to be a null set such that the shift register continues to automatically shift without the receipt of additional external control signals. The shift registers can be configured to shift without requiring the receipt of another processor instruction and could continue to cycle through the pre-staged instructions as fast as the functional processing units can process them. As an example of a dependency, the shift registers can be configured to shift upon receiving the instruction fetch command of the processor. The instruction fetch command could be the signal received on input 403 in FIG. 4. As an example of another dependency, the shift register can be configured to require the receipt of another instruction before shifting. As another example, the shift registers can be configured to require another trigger instruction to be received before shifting. As another example, the shift registers can be configured to shift as soon as a response is received from memory that data has been successfully written thereto. As another example, the shift registers can be configured to shift in response to a combination of the events described above. In specific embodiments of the invention, the shift registers can be configured to exhibit any of these behaviors and the style of shifting used can be set by the payload of an initial trigger instruction or configuration instruction. For example, if the instruction in instruction register 413 should not be performed until some other instruction was received, shift register 402 could be configured to only shift when that instruction was received. However, if the instruction in instruction register 413 can proceed immediately after the instruction in instruction register 414, then shift register 402 could be configured to shift immediately as well.

The approaches described above with reference to FIG. 4 can be expanded for processors with multiple functional processing units. The processors can include multiple pre-staged instruction delivery logic circuits for delivering the correct pre-staged instructions to the appropriate functional processing unit. In single instruction multiple data (SIMD) implementations, the same instructions from the instruction registers can be provided to the multiple functional processing units at the same time. In pipelined parallel computing implementations, additional multiplexers and shift registers can be used for each functional processing unit to provide different instructions to the different functional processing units in parallel. The different functional processing units can be different kinds of functional processing units or can be the same type of functional processing unit conducting a different instruction or the same instruction on data that has been altered as it moves down a processing pipeline. The additional sets of multiplexers and shift registers can share a single set of instructions registers or they can each have their own set of instruction registers.

Figure 5:
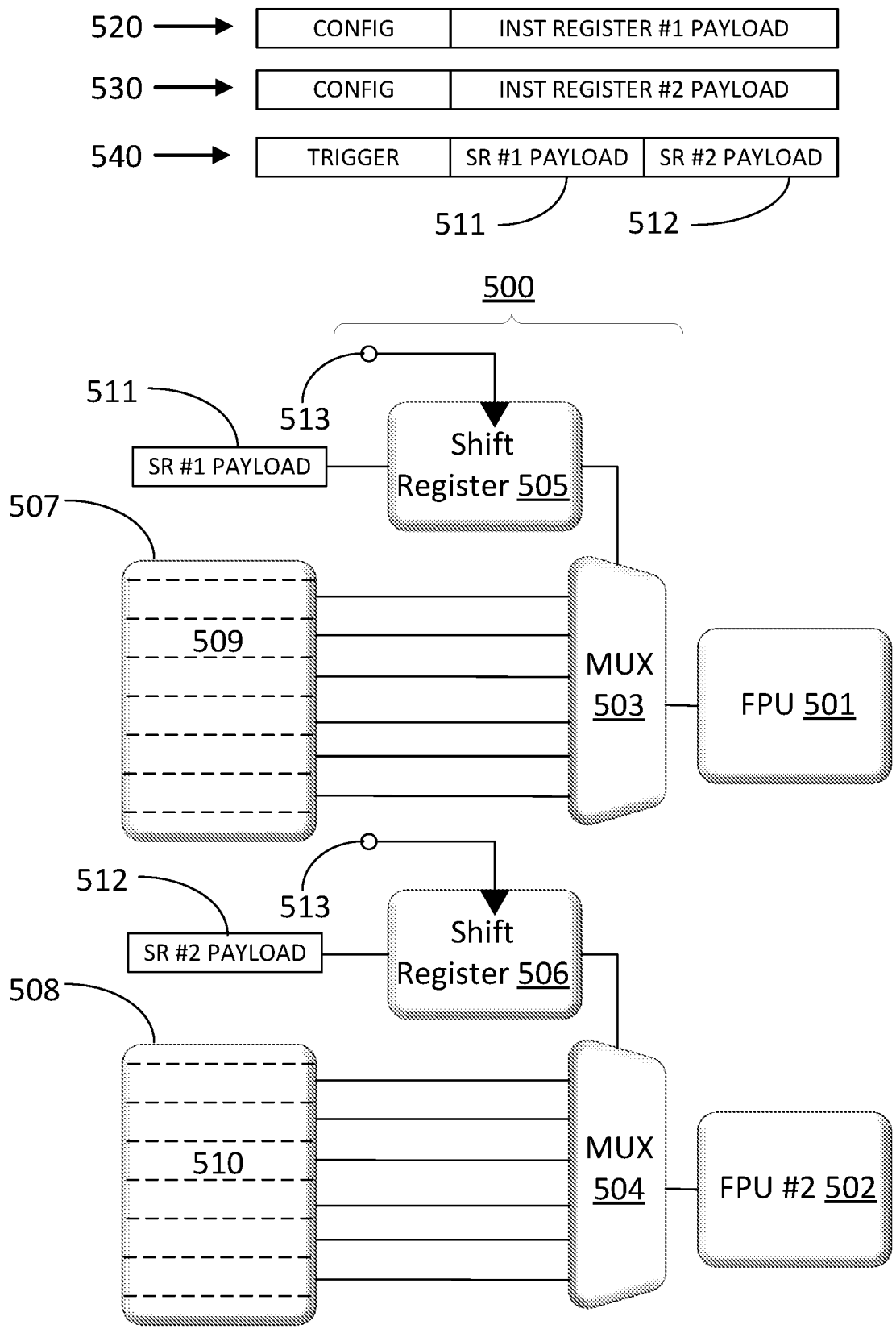
FIG. 5 illustrates a block diagram of a portion of a logic circuit and at least two functional processing units in accordance with specific embodiments of the invention disclosed herein.

FIG. 5 illustrates a block diagram of a portion of a logic circuit 500 with at least two functional processing units in accordance with specific embodiments of the invention disclosed herein. The illustrated functional processing units 501 and 502 could be functional processing units operating on different portions of a pipeline of a processor. The various ways in which the functional processing units 501 and 502 can be incorporated into the data path of the processor can be the same as those described with reference to functional processing units 102, 201, and 202 in FIG. 2. For example, functional processing units 501 and 502 could be connected to the same pipeline stage in the processor, could be in sequence in a systolic array paradigm, and/or could be mutually connected to a set of staging registers to support multiple potential pipeline paths. The functional processing units 501 and 502 could be the same kind of functional processing unit or different types of functional processing units. For example, the functional processing units could comprise two different functional processing blocks selected from: a load block, a data type conversion block, an arithmetic logic unit block, a floating-point math block, a rounding block, and a store block, and any other kind of specialized functional processing unit. Logic circuit 500 is another example of a circuit that can execute step 305 from FIG. 3 with the addition of the at least one functional processing unit including two functional processing units 501 and 502, and the providing of the pre-staged instructions from the set of instruction registers in step 305 including the providing of instructions to the two functional processing units 501 and 502 in parallel.

The operation of logic circuit 500 is similar to the operation of logic circuit 400 and similar principles can be applied to processing architectures with even more than two functional processing units operating in parallel. Furthermore, as stated above, each functional processing unit in logic circuit 500 could be mirrored by one or more functional processing units in a SIMD architecture where each of the mirrored functional processing units received the same instruction as the illustrated functional processing units. The two or more functional processing units could be arranged in parallel pipelines or sequentially in a single pipeline. The logic circuit 500 includes at least two multiplexers 503 and 504 controlled by at least two shift registers 505 and 506 in a one-to-one correspondence. The logic circuit of the processor is configured to load the at least two shift registers 505 and 506 with configuration information from an instruction. In the illustrated embodiments, the instruction is a trigger instruction 540 with two separate segments of configuration information 511 and 512 which are individually provided to shift registers 505 and 506. The configuration information 511 and 512 could be sequence information and include the addresses of specific registers in instruction registers 507 and 508 respectively in the address encoding space of multiplexers 503 and 504 respectively. The logic circuit for providing the configuration information to the shift registers could be the instruction decode logic of the processor.

In the illustrated embodiment, the logic circuit is configured to, using sequence information and the at least two shift registers, provide a set of pre-staged instructions to the two functional processing units in parallel. The set of pre-staged instructions from the set of instruction registers could be provided through the at last two multiplexers to the at least one functional processing unit. For example, shift register 505 could provide the address for register 509 in the encoding space of multiplexer 503 on the control input of multiplexer 503 at the same time shift register 506 could provide the address for register 510 in the encoding space of multiplexer 504 on the control input of multiplexer 504. As a result, multiplexer 503 would pass the instruction at register 509 to functional processing unit 501 and multiplexer 504 would pass the instruction at register 510 to functional processing unit 502. The registers 509 and 510 are not in the same part of their associated register sets to illustrate the fact that multiple multiplexers could be connected to the same set of instruction registers. Such an approach could make sense where multiple functional processing units were designed to recognize the same operational code (e.g., if functional processing unit 501 and functional processing unit 502 were the same type of functional processing unit). The logic circuit 500 could be designed to provide instructions to functional processing unit 501 and 502 in parallel in that both shift register 505 and 506 could be controlled by a common signal 513. For example, the common signal could be the processor instruction fetch command of the processor and cause the two shift registers to shift in parallel.

In approaches in accordance with FIG. 5, the instruction registers could be loaded with pre-staged instructions in a similar fashion to that described above with reference to FIG. 4. Specialized instructions such as configuration instructions could be sent from the instruction memory ex ante that are either loaded into the registers themselves or that include data used to load the registers. In the example of FIG. 5, trigger instruction 540 is preceded by a first configuration instruction 520 and a second configuration instruction 530. The trigger instruction 540 could be preceded by any number of instructions which would serve to load the instruction registers. As illustrated, configuration instruction 520 includes a first payload which can be at least a portion of a pre-staged instruction for storage in register 509, and configuration instruction 530 includes a second payload which can be at least a portion of a second pre-staged instruction for storage in instruction register 510. FIG. 5 is only illustrative, and in specific embodiments a single configuration instruction could include the data required to load more than one instruction register.

In specific embodiments of the invention, the functional processing units of the processor can be different types of functional blocks. For example, the functional processing units could be selected from a load block, a data type conversion block, an arithmetic logic unit block, a floating-point math block, a rounding block, and a store block, and any other form of fundamental or specialized functional processing unit. In these embodiments, the processor could be configured to deliver every instruction delivered on the instruction bus to the instruction decode logic of the circuit and have the operational codes of the instruction pushed to each of the functional processing units while only the functional processing units that were designed to conduct the associated operations would conduct an operation. In alternative embodiments, the instruction decode logic will include logic to evaluate the operational code and solely route it to the appropriate functional unit based on that evaluation. Regardless of the approach adopted, the instruction decode logic could be configured to treat specific instructions as both a regular instruction for execution by a functional processing unit and a trigger instruction as described elsewhere herein.

In specific embodiments of the invention, as described below with reference to FIG. 6, the trigger instruction can be identified by an operational code that will be acted upon by the functional processing units, but it will serve a dual purpose as a trigger instruction. These instructions can be referred to as operational trigger instructions. For example, if the operation were a load instruction, the instruction could be referred to as a load trigger instruction. In this example, the at least one functional processing unit could comprise a load block and at least one different functional block. The load trigger instruction could be a load instruction with dedicated space for additional configuration information, such as sequence information, to define how pre-staged instructions stored in instruction registers and intended for different functional blocks are executed. As another example, if the operation were a store instruction, the instruction could be referred to as a store trigger instruction. In this example, the at least one functional processing unit could comprise a store block and at least one different function block. The store trigger instruction could be a store instruction with dedicated space for additional configuration information as mentioned above with respect to the load instruction.

Embodiments utilizing operational trigger instructions can exhibit specific benefits. They would be specifically beneficial in approaches in which a specific functional processing unit was used in every sequence or pipeline of instructions executed by the processor. The previously mentioned load trigger instruction and store trigger instruction are examples of such instructions when they are used in a processing architecture configured with a load functional processing unit (being utilized as the first step of a sequence of operations performed utilizing the available functional processing units) or a store functional processing unit (being utilized as the last step of a sequence of operations performed utilizing the available functional processing units). These examples are generally beneficial in that most processing pipelines begin and end with loading data from memory and storing the resulting information back into memory. In embodiments in which the trigger instruction was a load trigger instruction, the instructions for the load functional processing unit could include an operational code to identify the instruction as a load instruction, the payload required for the load functional processing unit to operate (e.g., an address for data to be loaded into the pipeline), and configuration information of a trigger instruction as described above.

Figure 6:
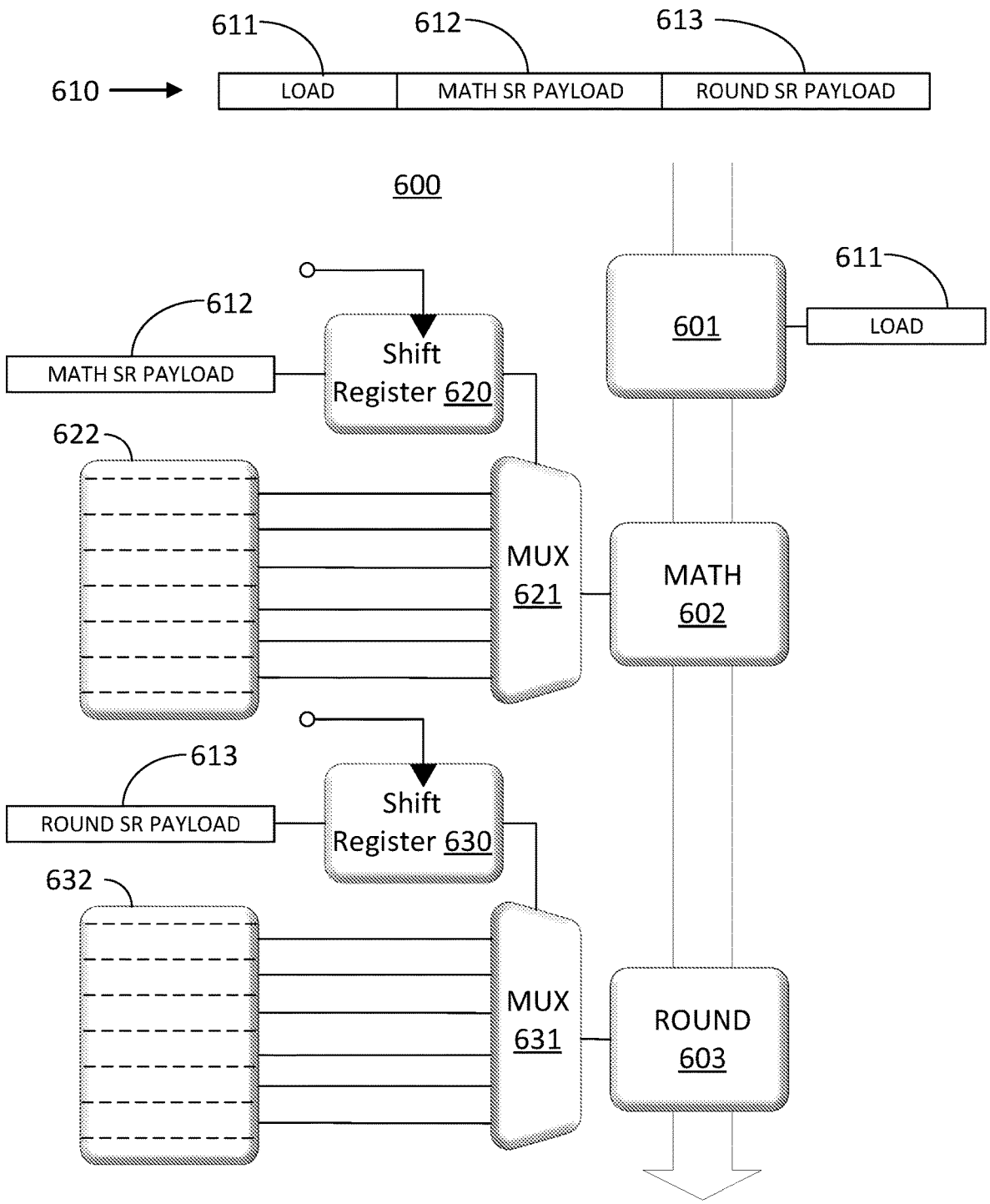
FIG. 6 illustrates a block diagram of a portion of a logic circuit designed to operate with a load trigger instruction in accordance with specific embodiments of the invention disclosed herein.

FIG. 6 illustrates a block diagram 600 of a portion of a logic circuit designed to operate with a load trigger instruction in accordance with specific embodiments of the invention disclosed herein. Block diagram 600 includes a pipeline of different functional processing units in the form of a load block 601, a math block 602, and a rounding block 603. The pipeline could also include additional blocks such as are described herein. As illustrated, load block 601 is not associated with a logic circuit for providing pre-staged instructions. Instead load block 601 receives a load instruction 611 as part of a load trigger instruction 610. The path illustrated for load block 601 to receive load instruction 611 could involve a standard instruction decode logic circuit. Load instruction 611 could provide load block 601 with an address from main memory or cache memory from which to load operand data for the remainder of the pipeline to operate on. At the same time, load trigger instruction 610 could include a math shift register payload 612 for delivery to shift register 620 and a round shift register payload 613 for shift register 630. The shift register payloads could, as in FIG. 5, specify addresses in instruction registers 622 in the address space of MUX 621, and addresses in instruction register 632 in the address space of MUX 631. The shift register payloads could include configuration information for the execution of multiple instructions by each of math block 602 and rounding block 603. The multiple instructions could be executed on multiple rounds of data being pipelined through the pipeline or multiple data elements through a single execution of the pipeline. This second type of instruction execution could involve staging registers to store intermediate values and multiple operations conducted by each functional processing unit. In specific embodiments of the invention, load trigger instruction 610 could specify an instruction for each of the functional processing units in the pipeline which would have otherwise required individual instructions from instruction memory such that a single load trigger instruction, delivered in synchronization with the instruction fetch command of the processor, would keep the entire pipeline operating with maximum parallelization without having to wait for additional instructions.

Figure 7:
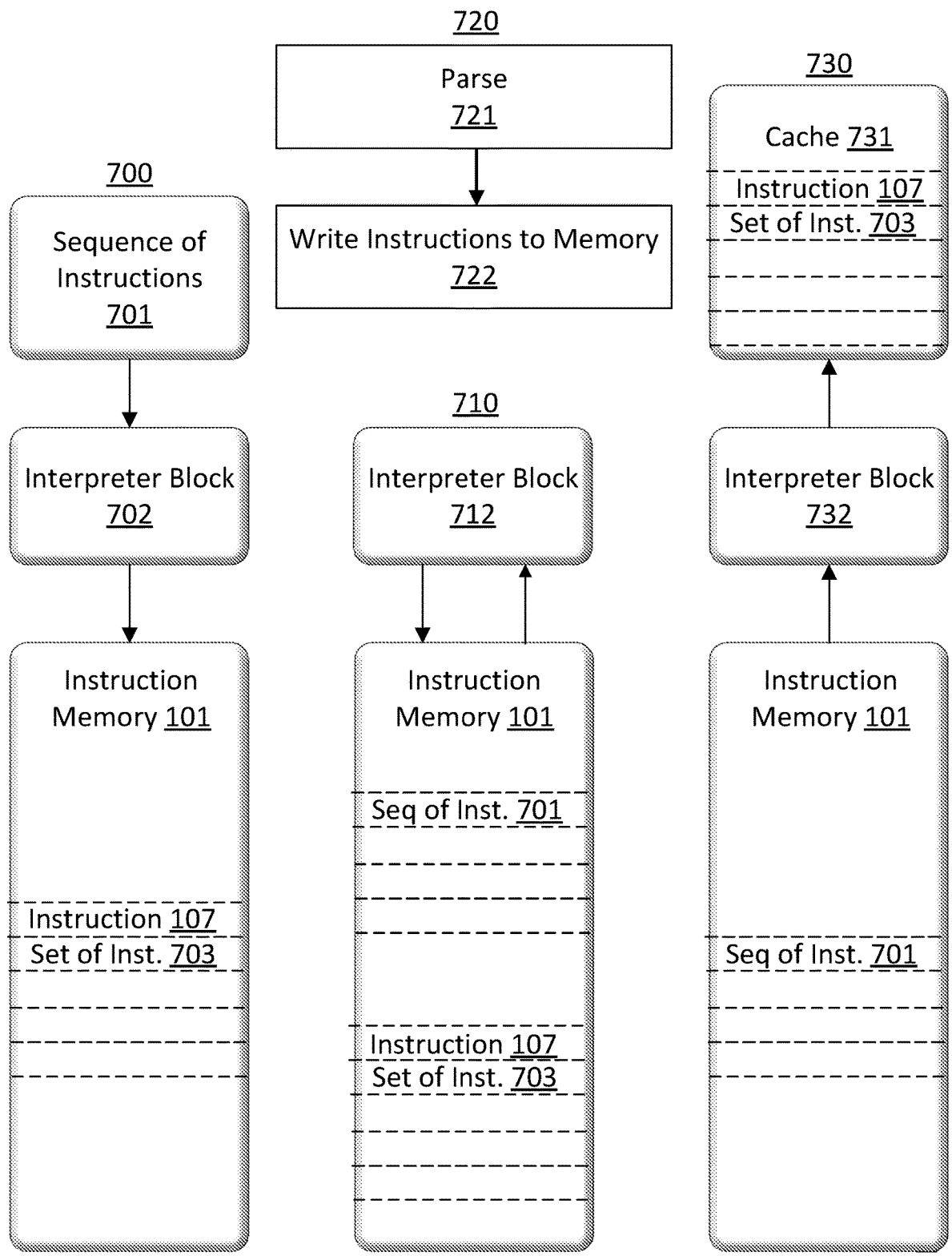
FIG. 7 illustrates a set of block diagrams and a flow chart for a set of methods that illustrate the operation of an interpreter block in accordance with specific embodiments of the invention disclosed herein.

FIG. 7 illustrates a set of block diagrams and a flow chart for a set of methods that illustrate the operation of an interpreter block in accordance with specific embodiments of the invention disclosed herein. The figures illustrate how the interpreter block can parse a sequence of instructions that has yet to be loaded into an instruction memory or that has already been loaded into an instruction memory. Based upon the parsing operation, and where the interpreter block is getting the instructions from, the interpreter block can then write instructions into the instruction memory for the first time, write instructions back into a separate location in the same memory, write instructions back into the same place in the same memory, or write instructions into a separate memory. As explained previously, the instructions that are provided by the interpreter block can differ from the instructions parsed by the interpreter block in that they will include the configuration instructions disclosed herein. To distinguish the instructions being parsed by the interpreter block from the instructions provided by the interpreter block the first can be referred to as a sequence of instructions and the second can be referred to as a set of instructions. In situations in which the interpreter block writes a set of instructions to a separate memory, the processor can include reconciliation logic which detects a discrepancy. The discrepancy can be detected by detecting that the instructions, which have been parsed by the interpreter block, have been modified in the instruction memory. In response to detecting the discrepancy, the reconciliation logic can notify the controller of the processor, or the instruction fetch control logic, that the set of instructions stored in the alternative memory is no longer valid. The set of instructions can then be deleted, ignored, or written over until they have been processed by the interpreter block.

Block diagram 700 includes interpreter block 702 and similar elements have similar labels to that of the block diagram of processor 100. Interpreter block 702 can be a hardware block configured to parse a sequence of instructions 701. Interpreter block 702 is coupled to instruction memory 101 and can write to instruction memory 101 via that coupling. The elements of block diagram 700 can be located on a processor. Sequence of instructions 701 can be provided by an external connection loading instructions into the processor. Sequence of instructions 701 can be from a software compiler. Sequence of instructions 701 can be instructions encoded using the instruction set of the processor on which the elements of block diagram 700 are located. Interpreter block 702 can parse sequence of instructions 701 as it is received in a parsing operation, recognize redundancies, and write a new set of instructions 703 and instruction 107 to instruction memory 101 based on the parsing operation and the redundancies (e.g., at least one redundancy). The redundancies can be recognized by saving the instructions as they are received and comparing newly received instructions to the saved instructions. Set of instructions 703 can be different from sequence of instructions 701 in that the set of instructions includes configuration and trigger instructions, such as instruction 107. Set of instructions 703 can also be different in that it includes instructions that are meant to be pre-staged in the instruction registers mentioned herein. For example, a redundancy can be replaced with one set of the instructions that define the redundancy, a configuration instruction, and two trigger instructions.

Block diagram 710 includes interpreter block 712 and similar elements have similar labels to that of block diagram 700 and the block diagram of processor 100. Interpreter block 712 is coupled to instruction memory 101 and can both read from and write to instruction memory 101 via that coupling. The elements of block diagram 710 can be located on a processor. Interpreter block 712 can be a hardware block configured to parse a sequence of instructions such as sequence of instructions 701. However, interpreter block 712 can be designed to read sequence of instructions 701 from instruction memory 101 to access a sequence of instructions that has been previously stored in instruction memory 101. The sequence of instructions can be instructions encoded using the instruction set of the processor on which the elements of block diagram 710 are located. Interpreter block 712 can parse the sequence of instructions as it is read from instruction memory 101 in a parsing operation, recognize redundancies, and write a new set of instructions 703 and instruction 107 to instruction memory 101 based on the parsing operation and the redundancies (e.g., at least one redundancy). The redundancies can be recognized by saving the instructions as they are read from memory and comparing newly received instructions to the saved instructions. Set of instructions 703 can be different from the sequence of instructions read from memory in that it includes configuration and trigger instructions, such as instruction 107. Set of instructions 703 can also be different in that it includes instructions that are meant to be pre-staged in the instruction registers mentioned herein. For example, a redundancy can be replaced with one set of the instructions that define the redundancy, a configuration instruction, and two trigger instructions. In this example, reconciliation logic can be used to detect a modification to sequence of instructions 701 prior to the execution of set of instructions 703 and alert the controller, or some other instructions control system, that set of instructions 703 is no longer valid.

Block diagram 730 includes interpreter block 732 and similar elements have similar labels to that of block diagram 700 and the block diagram of processor 100. Interpreter block 732 is coupled to instruction memory 101 and can read from instruction memory 101 via that coupling. The elements of block diagram 730 can be located on a processor. Interpreter block 732 can be a hardware block configured to parse a sequence of instructions such as sequence of instructions 701. Interpreter block 732 can be designed to read sequence of instructions 701 from instruction memory 101 to access a sequence of instructions that has been previously stored in instruction memory 101. The sequence of instructions can be instructions encoded using the instruction set of the processor on which the elements of block diagram 730 are located. Interpreter block 732 can parse the sequence of instructions as they are read from instruction memory 101 in a parsing operation, recognize redundancies, and write a new set of instructions 703 and instruction 107 to a separate memory 731 based on the parsing operation and the redundancies (e.g., at least one redundancy). The redundancies can be recognized by saving the instructions as they are read from memory and comparing newly received instructions to the saved instructions. Set of instructions 703 can be different from the sequence of instructions read from memory in that it includes configuration and trigger instructions, such as instruction 107. Set of instructions 703 can also be different in that it includes instructions that are meant to be pre-staged in the instruction registers mentioned herein. For example, a redundancy can be replaced with one set of the instructions that define the redundancy, a configuration instruction, and two trigger instructions. Separate memory 731 can be a separate cache memory such as a micro-op cache or trace cache. Separate memory 731 can be the main memory that the instruction fetch or pre-decode logic pulls instructions from for the functional processing units of the pipeline. In alternative embodiments, the processor can be designed to pull instructions from either memory 731 or instruction memory 101 depending upon a mode of the controller. Memory 731 can be spaced apart from an execution area of the processor. In this example, reconciliation logic can be used to detect a modification to sequence of instructions 701 prior to the execution of the set of instructions 703 and alert the controller, or some other instructions control system, that set of instructions 703 is no longer valid.

The interpreter blocks in FIG. 7 can execute methods defined by flow chart 720 in FIG. 7. Flow chart 720 includes a step 721 of parsing a sequence of instructions to identify at least one redundancy such as a programming loop or set of repeated instructions. The parsing can be conducted using an interpreter block. Flow chart 720 also includes a step 722 of writing the set of instructions to the memory based on the parsing and the at least one redundancy identified in step 721. The interpreter blocks can be configured to conduct these steps such as by scanning through the sequence and saving instructions to compare with newly scanned instructions to recognize patterns. The steps can also be conducted using hard coded routines that utilize a counter to determine how many times a group of instructions are repeatedly used in a sequence and generate a configuration instruction and set of pre-staged instructions to represent one repetition, and a set of trigger instructions with a cardinality equal to the value of the counter and arranged in the sequence of instructions at each repetition in the original instructions. Interpreter blocks 712 can be configured to write instructions to the memory using access to an instruction fetch input and access to a bus used to write instructions to instruction memory 101.

In accordance with the preceding paragraphs, interpreter block 702, interpreter block 712, and interpreter block 732 can serve as means for conducting a parsing operation on a sequence of instructions and writing the instruction to the memory based on the parse operation. As stated above, the means for conducting a parsing operation on a set of instructions and writing the instruction to the memory based on the parse operation can be a hardware block.

A processor in accordance with this disclosure can include at least one non-transitory computer readable media. The at least one processor could comprise at least one computational node in a network of computational nodes. The media could include cache memories on the processor. The media can also include shared memories that are not associated with a unique computational node. The media could be a shared memory, could be a shared random-access memory, and could be, for example, a DDR DRAM. The shared memory can be accessed by multiple channels. The non-transitory computer readable media can store data required for the execution of any of the methods disclosed herein, the instruction data disclosed herein, and/or the operand data disclosed herein. The computer readable media can also store instructions which, when executed by the system, cause the system to execute the methods disclosed herein. The concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device.

A processor in accordance with this disclosure can include at least one logic circuit as described above. The logic circuit can include both active and passive devices and operate with one or more logic levels. The logic circuit can operate using Boolean logic and can be a synchronous clocked circuit or an asynchronous circuit. The logic circuit can include logic gates, flip-flops, latches, registers, and other fundamental circuit components that are required to produce a digitized logical output in response to a digitized logical input. The logic circuit can be implemented directly in hardware such that a logic or operation is conducted by a physical collection of transistors that implement an OR gate and the storage of a data element involves the physical state of at least one flip-flop, delay line, or other physical storage element.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. A processor comprising:
   a memory;
   at least one functional processing unit;
   a bus coupled to the memory;
   a set of instruction registers coupled to the bus and storing a set of pre-staged instructions from the memory; and
   a logic circuit coupled to the set of instruction registers and the at least one functional processing unit to provide the set of pre-staged instructions from the set of instruction registers to the at least one functional processing unit in response to receiving an instruction from the memory.

2. The processor of claim 1, further comprising:
   an interpreter block coupled to the memory;
   wherein the interpreter block is configured to conduct a parse operation on a set of instructions;
   wherein the parse operation identifies at least one redundancy; and
   wherein the interpreter block is configured to write the instruction to the memory based on the parse operation and the at least one redundancy.

3. The processor of claim 2, wherein:
   the interpreter block is a hardware block.

4. The processor of claim 1, further comprising:
a means for conducting a parsing operation on a set of instructions and writing the instruction to the memory based on the parsing operation;
wherein the means for conducting a parsing operation on a set of instructions and writing the instruction to the memory based on the parsing operation is a hardware block.

5. The processor of claim 1, further comprising:
a core controller;
wherein the processor is a processing core; and
wherein the core controller is configured to load, using the bus, the set of pre-staged instructions from the memory to the set of instruction registers.

6. The processor of claim 1, wherein:
the processor has an instruction set;
the bus is at least as wide as an instruction size of the instruction set;
the set of pre-staged instructions in the set of pre-staged instructions each have a size equal to the instruction size; and
the instruction has a size equal to the instruction size.

7. The processor of claim 1, wherein:
the logic circuit includes an instruction decode logic circuit; and
the at least one functional processing unit and the instruction decode logic circuit execute instructions from the memory.

8. The processor of claim 1, wherein the logic circuit comprises:
a shift register; and
a multiplexer that is control-coupled to the shift register;
wherein the logic circuit is configured to load the shift register with sequence information from the instruction; and
wherein the logic circuit is configured to, using the sequence information and the shift register, provide the set of pre-staged instructions from the set of instruction registers through the multiplexer to the at least one functional processing unit.

9. The processor of claim 8, wherein:
the shift register is configured to shift when a set of designated dependencies have been satisfied.

10. The processor of claim 1, wherein:
the instruction includes selection information and sequence information;
the logic circuit is configured to select, using the selection information, a subset of the set of pre-staged instructions; and
the logic circuit is configured to provide, in accordance with the sequence information, the subset of the set of pre-staged instructions to the at least one functional processing unit.

11. The processor of claim 1, wherein:
the instruction includes sequence information; and
the logic circuit is configured to provide the set of pre-staged instructions from the set of instruction registers to the at least one functional processing unit using the sequence information from the instruction.

12. The processor of claim 1, further comprising:
a set of staging registers accessible to the at least one functional processing unit;
wherein the instruction includes configuration information;
wherein the logic circuit is configured to provide the set of pre-staged instructions from the set of instruction registers to the at least one functional processing unit along with the configuration information; and
wherein the configuration information sets addresses in the set of staging registers to be used by the set of pre-staged instructions.

13. The processor of claim 1, wherein:
the at least one functional processing unit includes at least two functional processing units; and
the logic circuit provides at least two pre-staged instructions from the set of pre-staged instructions to the at least two functional processing units in parallel.

14. The processor of claim 1, wherein the logic circuit comprises:
at least two multiplexers controlled by at least two shift registers in a one-to-one correspondence;
wherein the logic circuit is configured to load the at least two shift registers with sequence information from the instruction;
wherein the at least one functional processing unit includes at least two functional processing units; and
wherein the logic circuit is configured to, using the sequence information and the at least two shift registers, provide the set of pre-staged instructions to the at least two functional processing units in parallel.

15. The processor of claim 1, wherein:
the logic circuit comprises at least two multiplexers controlled by at least two shift registers in a one-to-one correspondence;
the at least one functional processing unit comprises at least two different functional blocks selected from: a load block, a data type conversion block, an arithmetic logic unit block, a floating-point math block, a rounding block, and a store block;
the logic circuit is configured to load the at least two shift registers with sequence information from the instruction; and
the logic circuit is configured to, using the sequence information in the at least two shift registers, provide the set of pre-staged instructions from the set of instruction registers through the at least two multiplexers to the at least one functional processing unit.

16. A method, in which each step is conducted by a processor, comprising:
storing a set of instructions in a memory;
loading a set of pre-staged instructions from the memory to a set of instruction registers;
receiving an instruction at a logic circuit; and
providing, in response to receiving the instruction and using the logic circuit, the set of instructions from the set of instruction registers to at least one functional processing unit.

17. The method of claim 16, further comprising:
parsing, using an interpreter block and prior to storing the set of instructions in the memory, a sequence of instructions to identify at least one redundancy; and
writing the set of instructions to the memory based on the parsing and the at least one redundancy.

18. The method of claim 16, further comprising:
loading, using the logic circuit, a shift register of the logic circuit with sequence information from the instruction;
controlling a multiplexer with the sequence information from the shift register; and
providing, through the multiplexer, the set of instructions from the set of instruction registers to the at least one functional processing unit.

19. The method of claim 18, further comprising:

receiving a processor instruction fetch command; and shifting the shift register upon receiving the processor instruction fetch command.

20. The method of claim 16, wherein:

the at least one functional processing unit includes at least two functional processing units; and the providing of the set of instructions from the set of instruction registers includes providing instructions to the at least two functional processing units in parallel.

21. The method of claim 16, wherein:

the at least one functional processing unit comprise a load block and at least one different functional block; and the instruction is a load instruction with dedicated space for additional sequence information to define how the set of pre-staged instructions are executed.

22. A processor comprising:

a memory;

at least one functional processing unit;

a bus;

a set of instruction registers;

a means for conducting a parsing operation on a set of instructions stored in the memory, identifying at least one redundancy, and writing an instruction to the memory based on the parsing operation;

a means for loading the set of instruction registers with a set of pre-staged instructions using the bus; and a means for providing the set of pre-staged instructions from the set of instruction registers to the at least one functional processing unit in response to receiving the instruction from the memory.

* * * * *